(12) United States Patent  (10) Patent No.: US 7,675,216 B1
Eger                      (45) Date of Patent:    Mar. 9, 2010

(54) BRUSH SPRING RETAINERS

(75) Inventor: Leo A. Eger, Murrysville, PA (US)

(73) Assignee: Fulmer Company, LLC, Export, PA (US)

( * ) Notice: Subject to any disclaimer, the term of this patent is extended or adjusted under 35 U.S.C. 154(b) by 969 days.

(21) Appl. No.: 11/079,065

(22) Filed: Mar. 14, 2005

(51) Int. Cl.
 *H02K 13/00* (2006.01)
(52) U.S. Cl. .................................. 310/245; 310/239
(58) Field of Classification Search ............... 310/42, 310/229, 239–247, 220; 248/311.2
 See application file for complete search history.

(56) References Cited

U.S. PATENT DOCUMENTS

| 2,756,359 A | * | 7/1956 | Weissinger | 310/246 |
| 5,256,925 A | * | 10/1993 | Cutsforth | 310/247 |
| 5,491,373 A | | 2/1996 | Cooper et al. | |
| 5,870,026 A | | 2/1999 | Challenger | |
| 6,037,685 A | * | 3/2000 | Berfield | 310/68 C |
| 6,236,136 B1 | | 5/2001 | Hockaday et al. | |
| 6,246,144 B1 | | 6/2001 | Hockaday et al. | |
| 6,441,533 B1 | * | 8/2002 | Grosskopf et al. | 310/244 |
| 6,633,104 B1 | * | 10/2003 | Hershey et al. | 310/242 |
| 6,724,123 B2 | * | 4/2004 | Raye et al. | 310/239 |
| 2005/0194506 A1 | * | 9/2005 | Lang et al. | 248/311.2 |

* cited by examiner

*Primary Examiner*—Thanh Lam
(74) *Attorney, Agent, or Firm*—Dean W. Russell; Kilpatrick Stockton LLP

(57) ABSTRACT

Brush spring assemblies for heavy-duty use are addressed. Such assemblies may include constant-force springs used to bias carbon brushes into contact with commutator surfaces. They additionally may include temporary capture mechanisms for the springs, allowing the springs to be retracted—and retained in a retracted position—while brackets containing the springs are inserted into brush holders. Post insertion, the capture mechanisms may be manipulated so as to release the springs, permitting the springs thereafter to bias brushes toward the commutator surfaces.

14 Claims, 8 Drawing Sheets

BRUSH SPRING RETAINERS

FIELD OF THE INVENTION

This invention relates to holders, or cards, for devices typically called carbon brushes and more particularly to components of such holders, including retainers for springs included in the holders. The invention is especially, although not exclusively, useful for heavy-duty brush holders deployed on vehicles such as trains.

BACKGROUND OF THE INVENTION

U.S. Pat. No. 6,246,144 to Hockaday, et al., incorporated herein in its entirety by this reference, illustrates an exemplary holder assembly for two carbon brushes. A pair of coil springs is included within the assembly, with each spring biasing an associated brush toward the surface of a commutator or other rotating machine element. Because the coil springs likely are designed only for light-duty use, the force provided by such springs presumably may easily be overcome by compressing the springs manually.

By contrast, brush holders intended for use with locomotives, for example, must withstand much heavier duty. Consequently, their designs differ significantly from that of the Hockaday patent. Moreover, the severity of the environment in which train-mounted brush holders are placed has precluded use of conventional constant-force holders for these purposes. Instead, variable-force holders traditionally are used, notwithstanding that such holders could result in non-uniform performance and life, elevated brush wear, sparking, and increased potential for flash-over.

Drive motors for locomotives, furthermore, typically are integral with the drive trains and mounted on the undercarriages of the locomotives. Significant spatial constraints thus exist for the associated brush holders in connection both with their placement for use and their removal for brush replacement. To accommodate these constraints, "finger"-style brush holders have been created. Finger-style holders have low profiles and are easily disengaged from the corresponding brushes so as to facilitate replacement thereof when worn to unacceptable levels. They are, however, non-constant-force devices, as the spatial constraints prevent easy retraction of the their springs when brushes need to be removed and replacement brushes and spring brackets need to be returned to the holders. Indeed, in the past, extraordinary manual force has been required to counteract the spring forces and push spring brackets into brush holders.

SUMMARY OF THE INVENTION

The present invention resolves the problems created by having to provide extensive manual force to push spring brackets into heavy-duty brush holders (whether for locomotive use or otherwise). Assemblies of the invention include temporary capture mechanisms for the brush springs, allowing the springs to be retracted—and retained in a retracted position—while the brackets are inserted into the holders. Post insertion, the capture mechanisms may be manipulated so as to release the springs, permitting the springs thereafter to bias corresponding brushes toward commutator surfaces. This arrangement permits constant-force springs to be used, further avoiding issues associated with utilizing conventional variable-force springs.

Preferred capture mechanisms of the invention include a pair of arms and a sliding retainer. The arms are formed with portions extending outside the footprint of the retainer. As a result, when the retainer slides toward the arms, it tends to force them inward, allowing them to capture the free end of a spring. When the retainer is slid away from the arms, by contrast, the tensioned arms move outward, thereby releasing the free end of the spring. Capture mechanisms of the invention may, however, differ from the presently-preferred version and omit either the arms, retainer, or both the arms and retainer in favor of any other suitable design.

Assemblies of the invention additionally may include a generally V-shaped base, with an end of the spring fastened adjacent an end of a first leg of the "V." Fastened at the other end of the first "V" leg is the capture mechanism. The second leg of the "V" may, if desired, have a complex shape. Such shape, if present, may be designed to latch the assembly in place within a holder while allowing easy removal thereof for repair or brush replacement.

It thus is an optional, non-exclusive object of the present invention to provide mechanisms for retracting springs (or other biasing devices) and at least temporarily retaining them in retracted positions.

It is another optional, non-exclusive object of the present invention to provide such mechanisms which may release the springs after being inserted into brush holders for use.

It is also an optional, non-exclusive object of the present invention to provide brush assemblies permitting constant-force springs to be used with locomotives and in other extreme environments.

It is, furthermore, an optional, non-exclusive object of the present invention to provide assemblies that may easily be removed from holders when necessary or desired.

Other objects, features, and advantages of the present invention will be apparent to those skilled in the relevant art with reference to the remaining text and drawings of this application.

DETAILED DESCRIPTION

Figure 1:
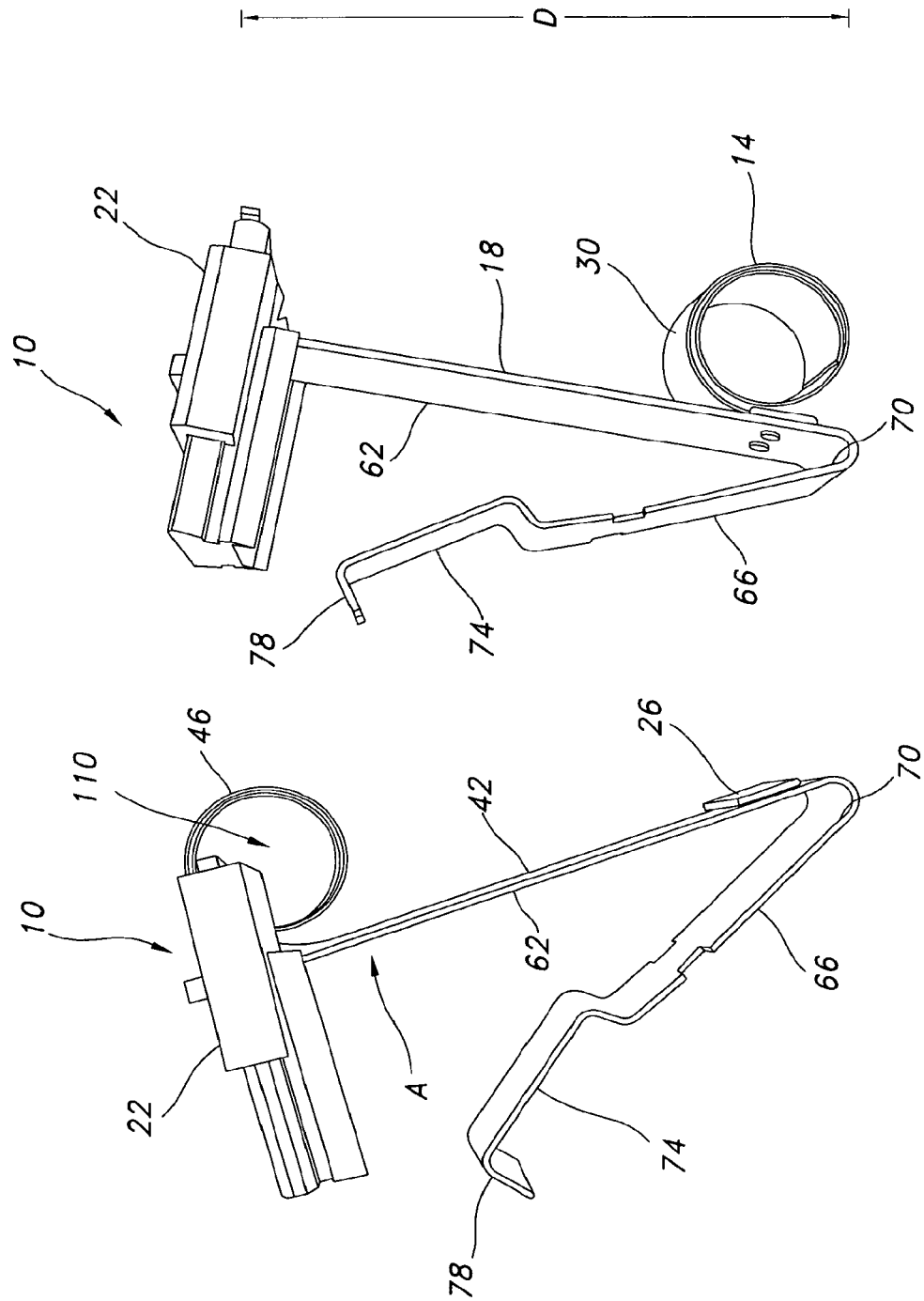
FIG. 1A illustrates an exemplary brush spring assembly of the present invention with the spring unretracted.
FIG. 1B illustrates the brush spring assembly of FIG. 1A with the spring retracted.

FIGS. 1A-1B detail exemplary brush spring assembly 10 of the present invention. Preferably included as part of assembly 10 are spring 14, base 18, and capture mechanism 22. Also shown in FIGS. 1A-1B are one or more fasteners 26, which function to attach end 30 of spring 14 to base 18. Although rivets 34 and bar 38 (see FIG. 2) constitute preferred fasteners 26, those skilled in the art will recognize that numerous other fastening mechanisms may be used instead.

FIG. 1A details metallic spring 14 in a rolled, unretracted position. In this rolled position, it is available to contact and bias an associated brush toward a commutator surface. Further, because of its construction, spring 14 may provide relatively constant bias force to the brush, avoiding problems related to utilizing non-constant-force springs.

By contrast, FIG. 1B illustrates spring 14 in a partially unrolled, retracted position. In this position, spring 14 defines two portions: a generally linear portion 42 and a rolled portion 46. As shown in FIG. 1B, rolled portion 46 may be retained by capture mechanism 22, a significant feature of the present invention. When portion 46 is so retained, assembly 10 may be fitted manually into holder 50 (see FIG. 2) without the installer having to apply force to counteract that of spring 14.

Figure 2:
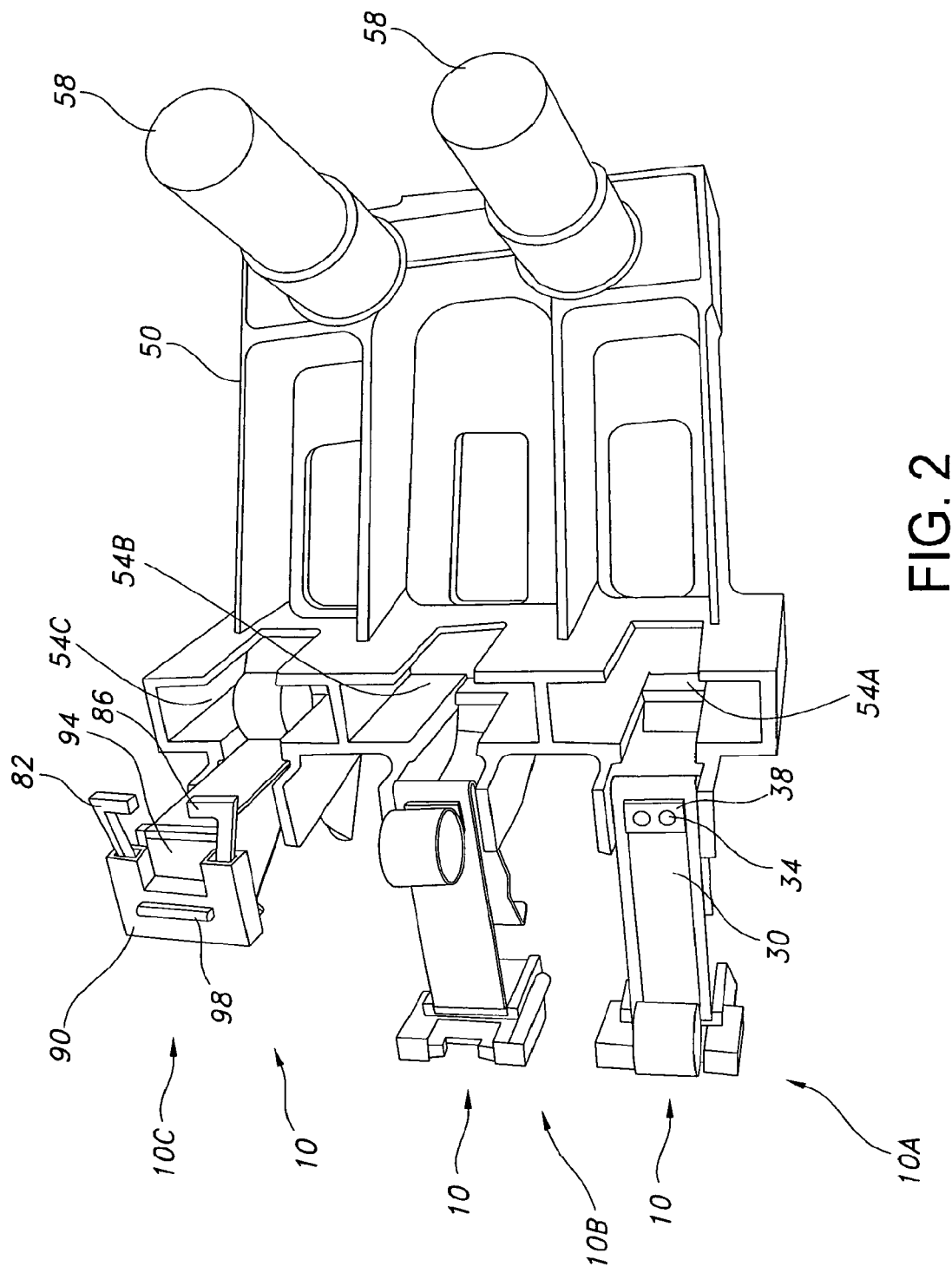
FIG. 2 illustrates an exemplary heavy-duty brush holder adapted to hold three brushes as well as three brush spring assemblies consistent with FIGS. 1A-B.

Shown in FIG. 2 is an exemplary holder 50. As illustrated, holder 50 accepts three brushes and three corresponding assemblies 10, one each in areas 54A, 54B, and 54C. Holder 50 need not accept exactly three brushes, however, and instead may accept fewer or greater than this number. Likewise, neither holder 50 nor insulator pins 58 need be configured as detailed in FIG. 2.

Also shown in FIG. 2 are three assemblies 10 in differing states of readiness for use. Assembly 10A, for example, has been prepared for insertion into area 54A, with spring 14 retained by capture mechanism 22 in a retracted position. Assembly 10C is illustrated as inserted into area 54C, with spring 14 having been released from capture mechanism 22 so as to contact a face of a brush (not shown) below. Assembly 10B, by contrast, is in process of being removed from area 54B as, for example, when it must be repaired or its associated brush must be replaced.

FIGS. 1-4 also detail aspects of exemplary base 18. Base 18 may (but need not necessarily) comprise a generally "V" shape made of metal, with legs 62 and 66 terminating at vertex 70. Leg 62, further, preferably may be substantially flat or linearly-oriented, while leg 66 preferably has a more complex shape. Base 18 may be made of metal or any other material allowing legs 62 and 66 manually to be forced closer together, as by an installer pushing leg 66 toward leg 62 in the direction of arrow A. Thus, if recessed segment 74 helps latch assembly 10 in position within holder 50, the latching may be undone merely by having the installer push flange 78, thereby causing leg 66 to travel in the direction of arrow A.

FIGS. 1-4 similarly show features of a retaining means such as capture mechanism 22. Like spring 14, mechanism 22 preferably is connected to base 18. Mechanism 22 also preferably is connected to leg 62 of base 18 opposite vertex 70. Consequently, some distance D exists between mechanism 22 and end 30 of spring 14, thereby allowing portion 42 to be unrolled approximately distance D before being captured by mechanism 22. Mechanism 22 may be made of polyetherimide obtained from, e.g., Polymer Resources, Ltd., or any other suitable material.

Figure 3:
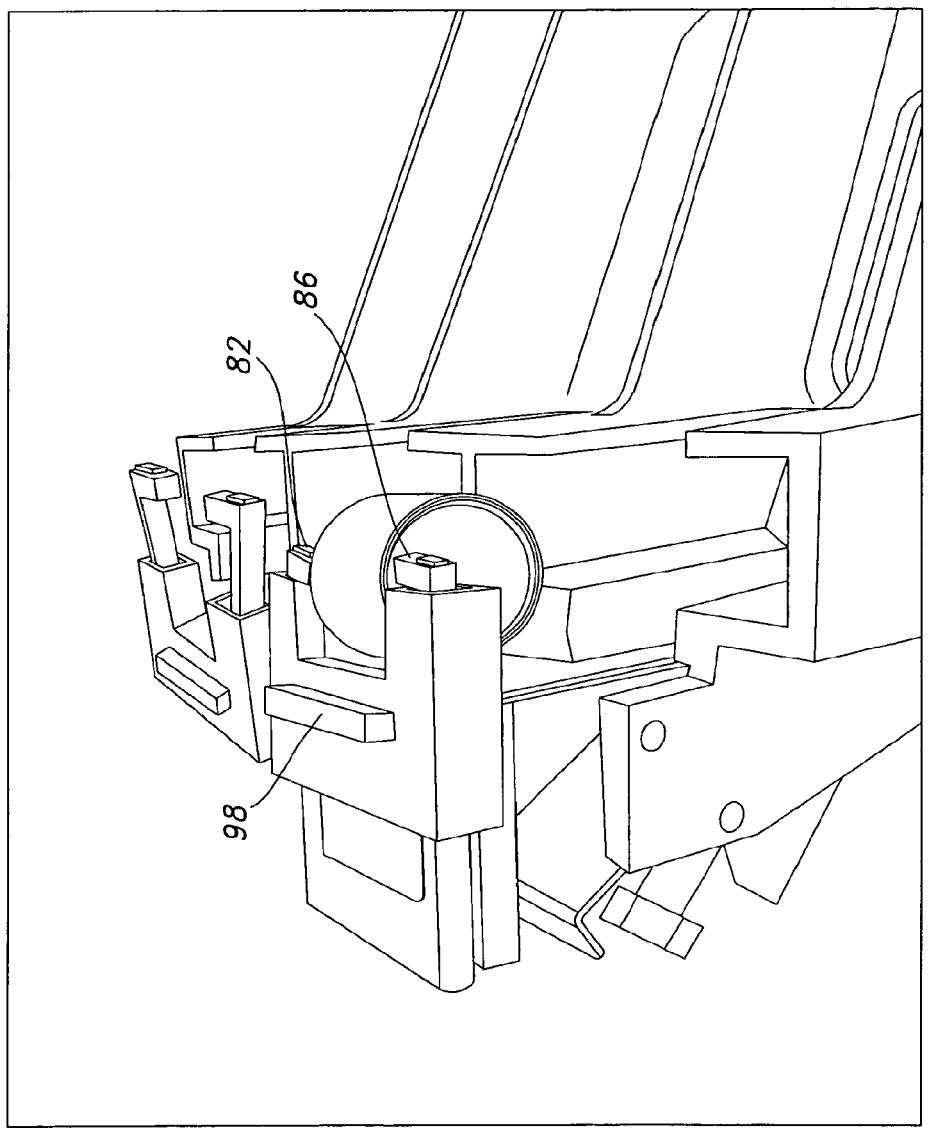
FIG. 3 illustrates the brush spring assembly of FIG. 1B immediately prior to release of the spring.
Figure 4:
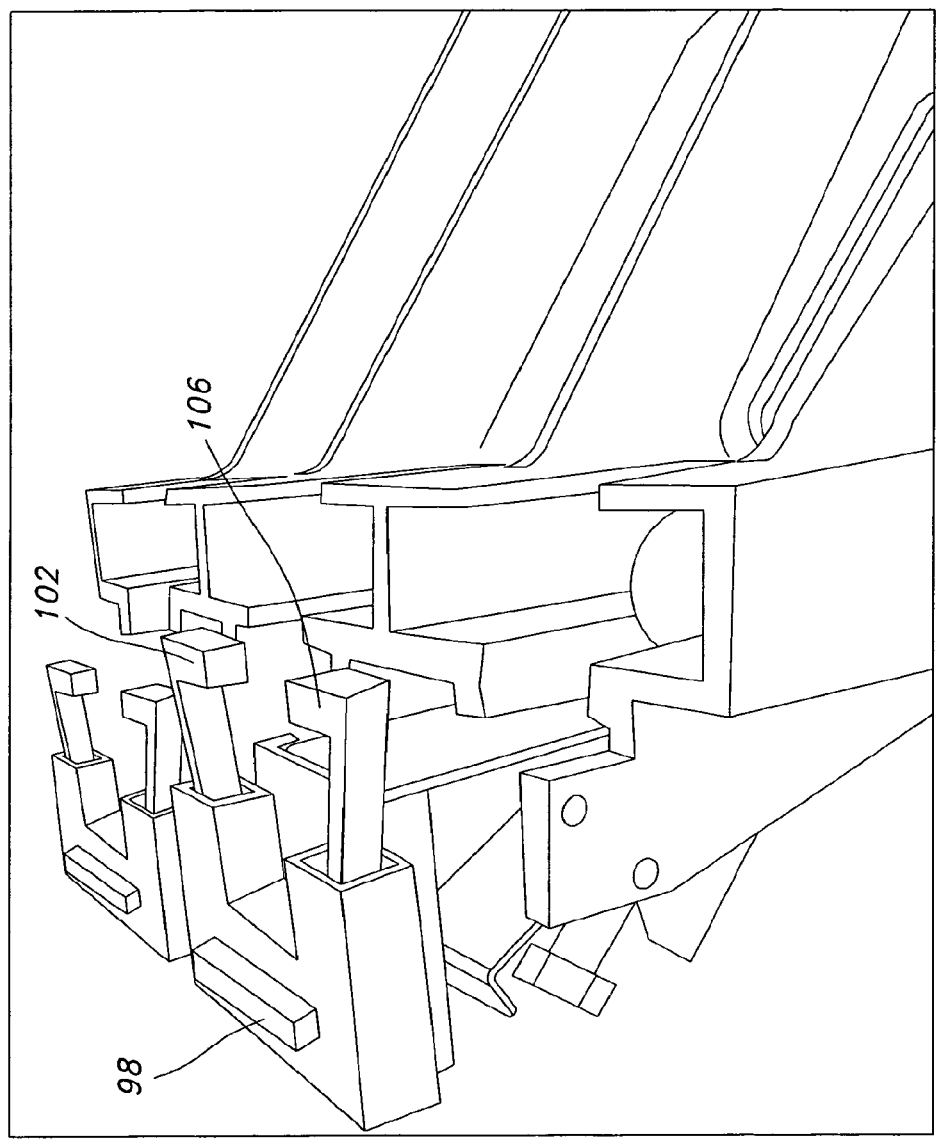
FIG. 4 illustrates the brush spring assembly of FIG. 1B immediately after the release of the spring.

Certain embodiments of mechanism 22 comprise arms 82 and 86, retainer 90, and foot 94. Foot 94 is fastened in any appropriate way to leg 62, and arms 82 and 82 are either connected to or integrally formed with foot 94. Generally U-shaped retainer 90 includes channels positioned about arms 82 and 86 and is configured so as to be able to slide forward and back along arms 82 and 86. FIG. 3 illustrates retainer 90 in its forward position, while FIG. 4 depicts the retainer 90 in its rearward position. Protrusion 98, if present, may be employed to facilitate sliding retainer 90 using a thumb or finger of an installer. Mechanism 22 further is configured in any manner suitable to prevent retainer 90 from separating entirely from foot 94.

As illustrated especially in assembly 10C of FIG. 2 and in FIG. 4, arms 82 and 86 may cant outward, beyond the footprint of retainer 90. As a result, as retainer 90 slides forward, it forces arms 82 and 86 inward, as shown by assemblies 10A and 10B of FIG. 2 and in FIG. 3. Sliding retainer 90 rearward, therefore, allows arms 82 and 86 to spring out, back to their normal (canted) positions.

Arms 82 and 86 include respective fingers 102 and 106. As arms 82 and 86 are forced inward, so too are fingers 102 and 106 until they project well into space 110 (see FIG. 1B) formed by rolled portion 46. As so projecting, fingers 102 and 106 function to lock rolled portion 46 in place, thereby retaining spring 14 in its retracted position.

Figure 5A:
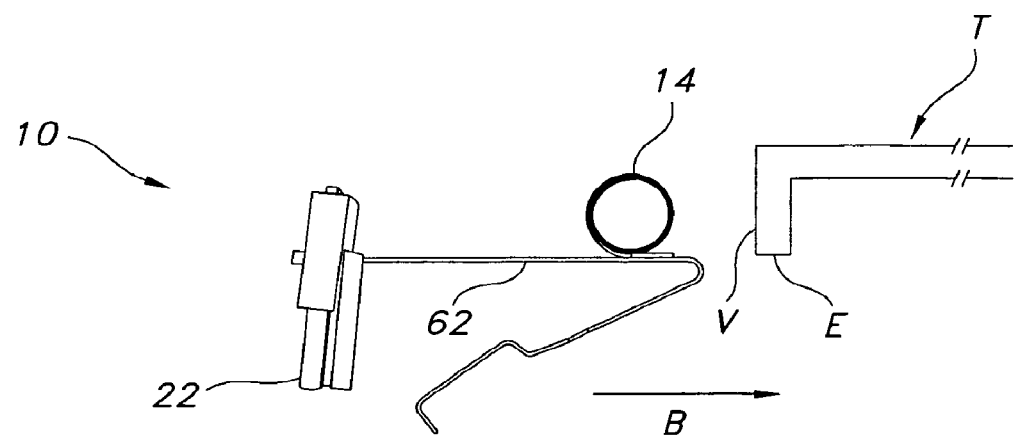
FIGS. 5A-C illustrate an exemplary process that may be used to capture the spring of the brush spring assembly of FIG. 1B.
Figure 5B:
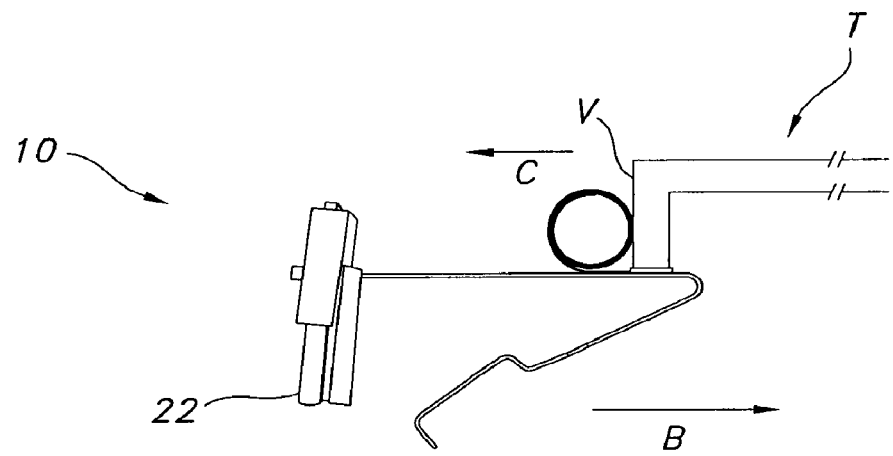
Figure 5C:
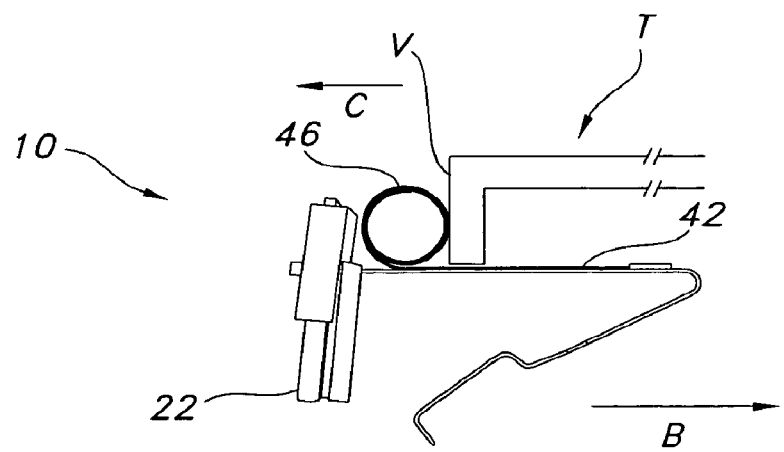

Detailed in FIGS. 5A-C are sequential operations that may be employed to prepare spring 14 for retention within capture mechanism 22. Shown in these figures is a table T with a vertical surface V terminating in lower edge E. If assembly 10 is moved toward table T (as shown by directional arrow B in FIG. 5A), spring 14 eventually will contact surface V. Further movement of assembly 10 in direction B, with leg 62 passing below edge E, will result in surface V forcing spring 14 to begin unrolling (FIG. 5B) in the direction of arrow C. Continued movement of assembly 10 in direction B results in further unrolling of spring 14, creating linear portion 42 and placing rolled portion 46 in position for capture by mechanism 22 (FIG. 5C).

Reference to table T, surface V, and edge E herein is for explanatory purposes only. Persons skilled in the art will recognize that numerous alternate methods of appropriately positioning spring 14 exist for capture by mechanism 22. Although some of these methods conceivably could employ a table or vertical surfaces, they need not necessarily do so.

Figure 6:
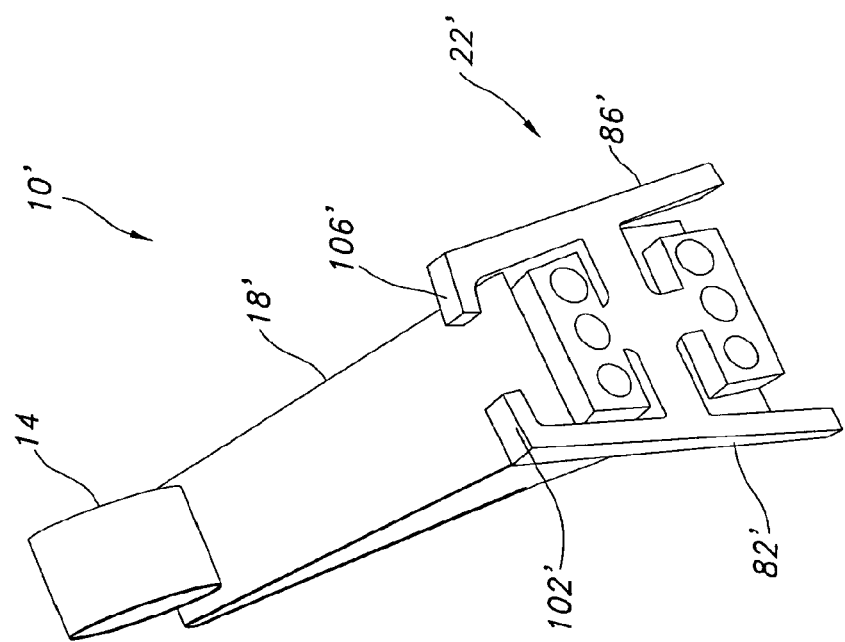
FIG. 6 illustrates an exemplary first alternative brush spring assembly of the present invention.
Figure 7:
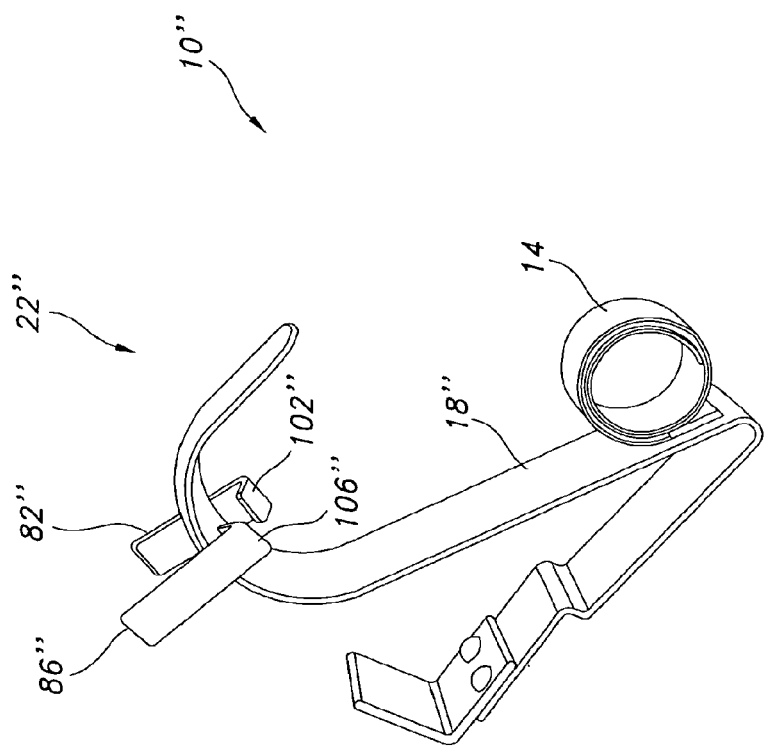
FIG. 7 illustrates an exemplary second alternative brush spring assembly of the present invention.
Figure 8:
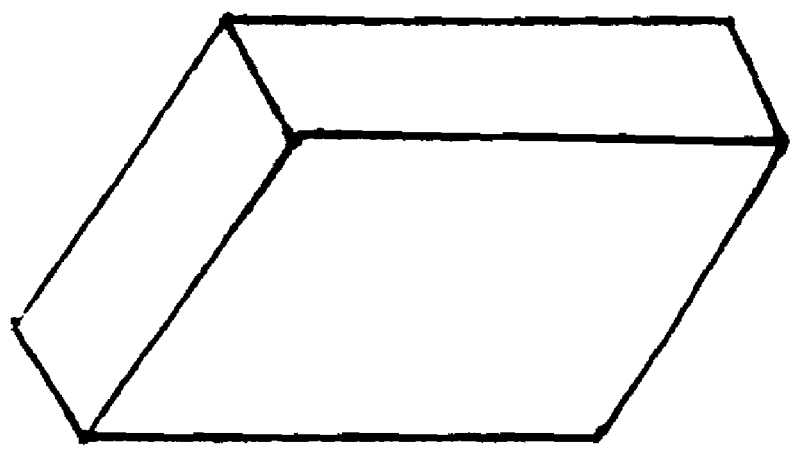
FIG. 8 depicts a generic brush capable of use with a brush holder described herein.

FIGS. 6 and 7 illustrate respective alternate assemblies 10' and 10". Like assembly 10, each of assemblies 10' and 10" may incorporate spring 14, respective bases 18' and 18", and respective capture mechanisms 22' and 22". Mechanisms 22' and 22", further, may include respective pairs of arms 82', 86', 82", and 86" and fingers 102', 106', 102", and 106". Unlike arms 82 and 86, however, arms 82', 86', 82", and 86" may be canted inward and, effectively, hinged. Pivoting arms 82', 86', 82", and 86" outward allows release of a retained spring 14 or positions the arms appropriately to capture rolled portion 46.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

What is claimed is:

1. A brush spring assembly comprising:
   a. a constant-force spring; and
   b. means for retaining the spring in a first, retracted position away from a brush and releasing the spring to a second, unretracted position in direct or indirect contact with the brush.

2. A brush spring assembly according to claim 1 in which the spring comprises a rolled strip.

3. A brush spring assembly according to claim 2 in which, in its first, retracted position, the spring is partially unrolled.

4. A brush spring assembly according to claim 3 further comprising a base to which the spring and retaining means are connected.

5. A brush spring assembly according to claim 4 in which the base has generally a "V"-shape, with the spring and retaining means being connected to the same leg of the "V"-shape.

6. A brush spring assembly according to claim 1 for insertion into a brush holder for a motor of a vehicle.

7. A brush spring assembly according to claim 6 in which the vehicle is a train.

8. A brush spring assembly according to claim 1 in which the retaining means comprises a pair of arms normally canted relative to a surface.

9. A brush spring assembly according to claim 8 in which the retaining means further comprises a retainer adapted to slide forward and rearward along the pair of arms.

10. A brush spring assembly according to claim 9 in which sliding the retainer forward forces the pair of arms inward toward each other.

11. A brush spring assembly according to claim 10 in which sliding the retainer rearward allows the pair of arms to return to an outwardly-canted position.

12. A method of placing a constant-force brush spring assembly in a brush holder, comprising:
  a. at least partially unrolling a rolled spring into a retracted position;
  b. capturing and retaining the spring in the retracted position using a capture mechanism;
  c. inserting the assembly into the brush holder; and
  d. manipulating the capture mechanism so as to release the spring from the retracted position into direct or indirect contact with a brush.

13. A brush holder comprising the brush spring assembly of claim 1.

14. A train comprising the brush holder of claim 13.

* * * * *